(12) United States Patent
Jeon

(10) Patent No.: US 6,334,082 B1
(45) Date of Patent: Dec. 25, 2001

(54) SHIFT CONTROL METHOD FOR AUTOMATIC TRANSMISSION

(75) Inventor: Byeong-Wook Jeon, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/616,887

(22) Filed: Jul. 14, 2000

(30) Foreign Application Priority Data

Dec. 10, 1999 (KR) .................................................. 99-56531

(51) Int. Cl.$^7$ .................................................. B60K 41/06
(52) U.S. Cl. .................................................. 701/55; 192/3.51
(58) Field of Search .................................... 701/55, 51, 58, 701/60; 74/732.1, 733.1; 192/3.51, 3.61

(56) References Cited

U.S. PATENT DOCUMENTS

| | | | |
|---|---|---|---|
| 4,905,545 | * | 3/1990 | Leising et al. .......................... 74/871 |
| 4,938,102 | * | 7/1990 | Leising et al. .......................... 74/866 |
| 4,944,200 | * | 7/1990 | Benford .................................. 74/887 |
| 4,982,620 | * | 1/1991 | Holbrook et al. ..................... 192/3.3 |
| 5,027,954 | * | 7/1991 | Benford ............................. 192/87.15 |
| 5,115,690 | * | 5/1992 | Leising et al. .......................... 74/868 |
| 6,175,797 | * | 1/2001 | Fizuka .................................. 701/55 |
| 6,226,564 | * | 5/2001 | Carlson ................................. 701/55 |

* cited by examiner

Primary Examiner—Richard M. Camby

(57) ABSTRACT

A shift control method for automatic transmissions includes the steps of outputting a duty control signal for upshifting to a N+1 speed when an N+1 upshifting signal is input during driving in an N speed, pre-estimating a stroke gap of a friction element for the N+1 speed, determining if an N speed kickdown signal is input or not, outputting a duty signal for downshifting to the N speed when the N speed kickdown signal is input. The step of preestimating a stroke gap includes the step of calculating an amount of hydraulic fluid accumulated on a side of the friction element. The step of calculating comprises the steps of calculating an amount of hydraulic fluid with respect to a duty ratio and integrating the calculated amount of hydraulic fluid.

8 Claims, 5 Drawing Sheets

SHIFT CONTROL METHOD FOR AUTOMATIC TRANSMISSION

BACKGROUND OF THE INVENTION (a). Field of the Invention

The present invention relates to an automatic transmission for vehicles. More particularly, the present invention relates to a shift control method for an automatic transmission which can prevent shifting retardation and increase in an RPM when a downshifting control is performed during the upshifting operation.

(b). Description of the Related Art

In the automatic transmission used for vehicles, a shift control system performs control to realize automatic shifting into different speeds and shift ranges according to various factors including throttle opening, vehicle speed and load, and several other engine and driving conditions detected through a plurality of sensors. That is, based on such various factors, the shift control system controls a plurality of solenoid valves of a hydraulic control system such that hydraulic flow in the hydraulic control system is controlled, ultimately resulting in shifting of the transmission into the various speeds and shift ranges.

In more detail, when the driver manipulates a shift lever to a particular shift range, a manual valve of the hydraulic control system undergoes port conversion as a result of the manual valve being indexed with the shift lever. Accordingly, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges and especially when changing speeds in the drive D range, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

In such shift control methods developed to date, when the vehicle is shifting from a second speed to a third speed and a kickdown state is realized by a driver depressing a gas pedal as shown in FIG. 6, a kickdown signal cannot be output. That is, the kickdown signal is output only after the second-to-third upshifting operation is completed and the hydraulic pressure within a hydraulic circuit is stabilized.

That is, since a shift control unit cannot identify the stroke variation of each piston for friction elements operated during the second-to-third upshifting operation, it cannot accept the command to downshift during the upshifting operation.

In addition, since stroke variation of each piston for the friction elements cannot be pre-estimated during the upshifting operation, a plurality of one-way clutches for the respective speed ratios should be provided, increasing the weight of the vehicle and the manufacturing costs.

SUMMARY OF THE INVENTION

The present invention has been made in an effort to solve the above problems.

It is an objective of the present invention to provide a shift control method for an automatic transmission which can improve shift quality and responsiveness by better performing the downshifting control during the up-shifting operation.

To achieve the above objective, the present invention provides a shift control method for automatic transmissions comprising the steps of outputting a duty control signal for upshifting to a N+1 speed when an N+1 upshifting signal is input during driving in an N speed, pre-estimating a stroke gap of a friction element for the N+1 speed, determining if an N speed kickdown signal is input or not, outputting a duty signal for downshifting to the N speed when the N speed kickdown signal is input.

The step of pre-estimating a stroke gap comprises the step of calculating an amount of hydraulic fluid accumulated on a side of the friction element.

The step of calculating comprises the steps of calculating an amount of hydraulic fluid with respect to a duty ratio and integrating the calculated amount of hydraulic fluid.

The step of calculating is performed during upshifting.

The shift control method may further comprise the step of correcting a duty ratio when the N speed kickdown signal is input.

The step of correcting comprises the steps of calculating a constant value with respect to an engine torque ratio, and multiplying the constant value by an integration value of hydraulic fluid directed to the friction element for the N+1 speed.

The step of outputting a duty signal comprises the steps of outputting the duty signal for a first predetermined time, outputting a duty signal for a second predetermined time, and controlling a duty ratio to 0%. The first predetermined time is about 500 ms.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
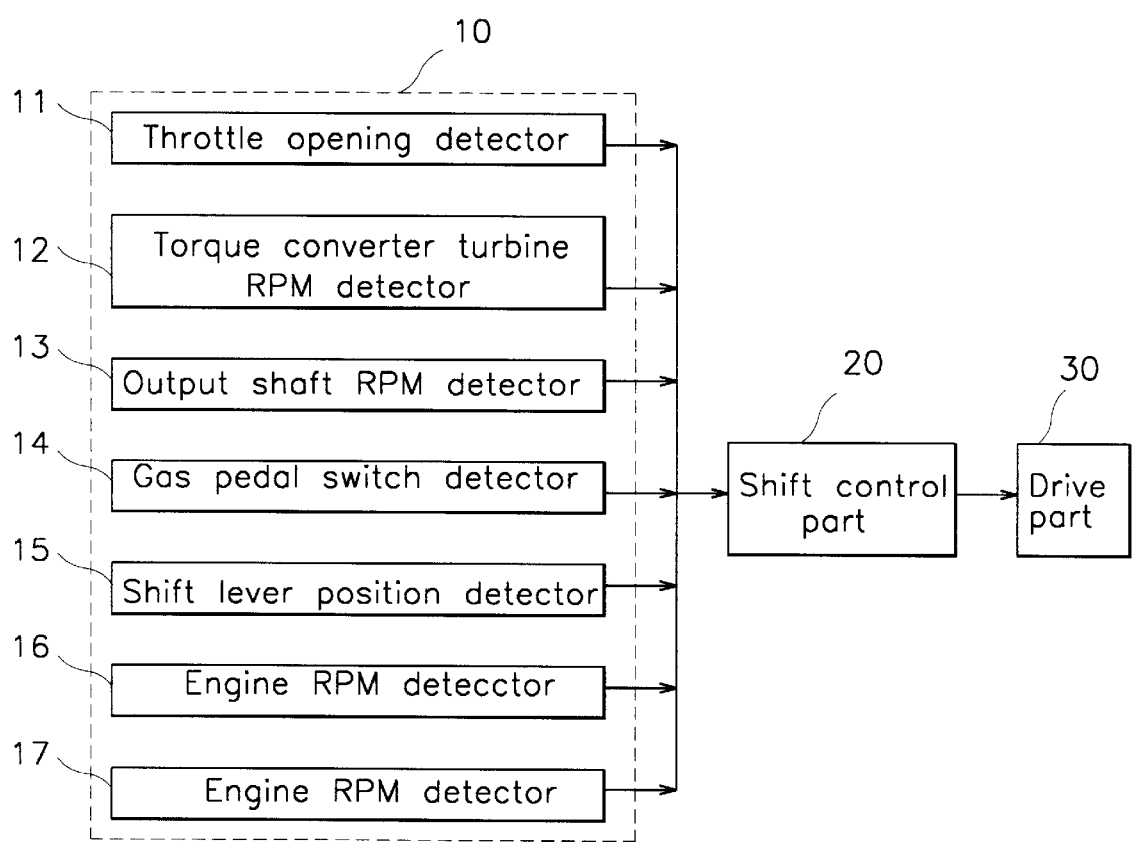
FIG. 1 is a block diagram of a shift control system which can be applied to the present invention.

FIG. 1 shows a block diagram of a shift control system which can be applied to the present invention.

The shift control system applicable to the present invention comprises: a drive condition detecting part 10 for detecting a drive condition of a vehicle and outputting corresponding signals, the drive condition detecting part 10 having a throttle opening detector 11, a torque converter turbine RPM detector 12, an output shaft RPM detector 13, a gas pedal switch detector 14, a shift lever position detector 15, a hydraulic fluid temperature detector 16, and an engine RPM detector 17; a shift control part 20 for controlling a shifting operation according to signals from the drive condition detecting part 10; and a drive part 30 for adjusting the flow of hydraulic fluid directed to friction elements for each speed ratio according to a shift control signal transmitted from the shift control part 20.

A shift control method that can be realized using the above described shift control system will be described with reference to FIGS. 2 to 5.

Figure 2:
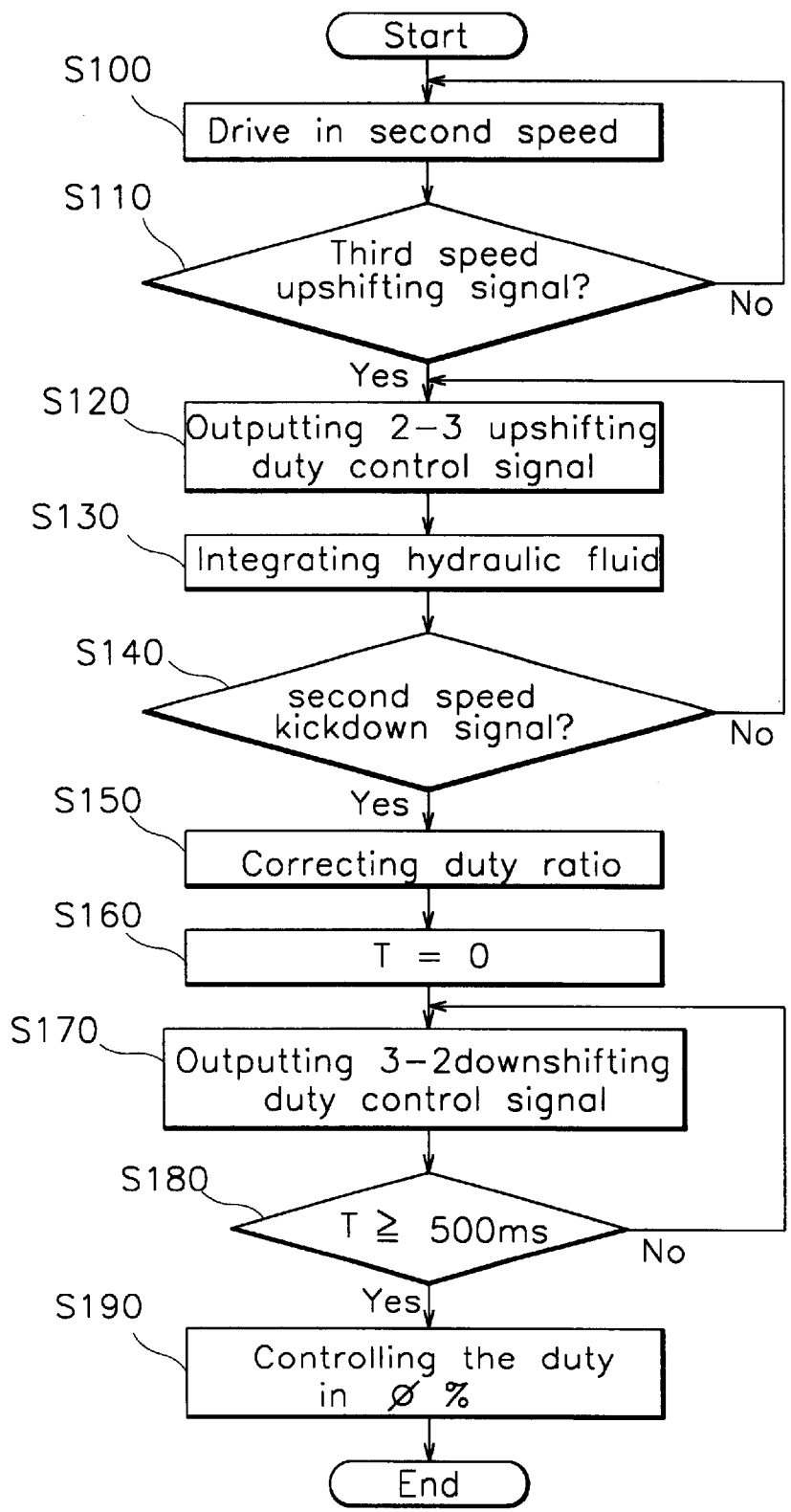
FIG. 2 is a flow chart of a shift control method according to a preferred embodiment of the present invention.
Figure 3:
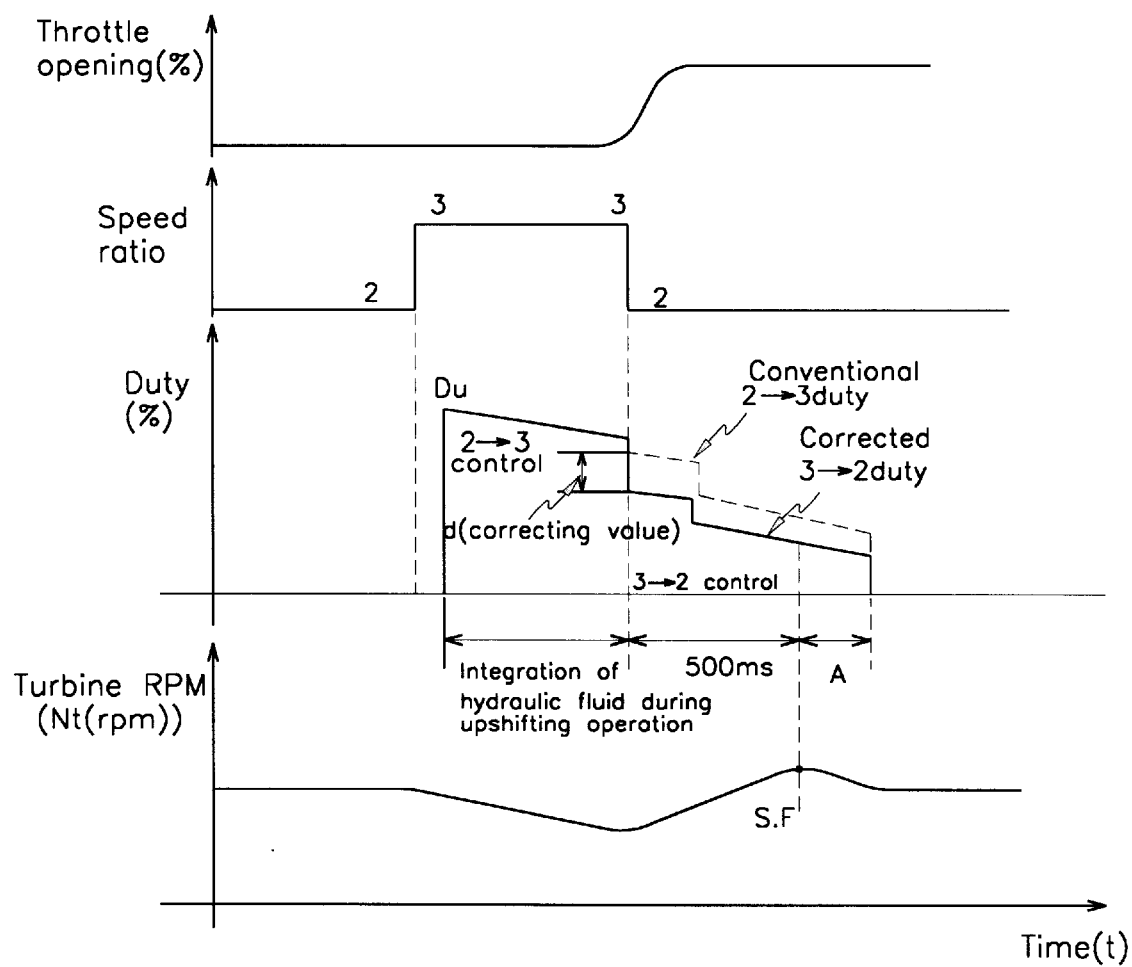
FIG. 3 is graph of a shift control pattern during the operation of the shift control method of the present invention.

FIG. 2 shows a flow chart of a shift control method according to a preferred embodiment of the present invention. In this embodiment, although a third-to-second downshifting control during a second-to-third upshifting operation is illustrated as an example, the present invention is not limited thereto. That is, the concept of the present invention may be applied to, for example, a fourth-to-third downshifting control during a third-to-fourth up-shifting operation.

If a signal corresponding to, for example, a second speed is transmitted from the drive condition detecting part 10 to the shift control part 20, the shift control part 20 controls the drive part 30 to drive the vehicle at the second speed (S100).

In this state, the shift control part 20 determines if a third speed signal is applied or not by receiving signals regarding the throttle opening, the turbine RPM, the state of the gas pedal, the shift lever position, and the temperature of the hydraulic fluid from the drive condition detecting part 10 (S110).

When the third speed signal is applied, the shift control part 20 outputs a 2–3 upshifting duty control signal to the drive part 30 (S120). Then, the drive part supplies hydraulic fluid to friction elements for the third speed and releases hydraulic fluid which has been supplied to friction elements for the second speed, according to the 2–3 upshifting duty control signal.

However, in step S110, if the third speed signal is not applied to the shift control part 20, the shift control part 20 keeps transmitting the second speed signal to the drive part 30. After outputting the 2–3 upshifting duty control signal to the drive part 30, the shift control part 20 integrates the hydraulic fluid directed to the friction elements for the third speed at a predetermined time interval according to the following equation 1.

$$P = \sum_{n=0}^{n} Pr \quad \text{[Equation 1]}$$

Where P indicates the integration value and Pr an amount of hydraulic fluid.

Figure 4:
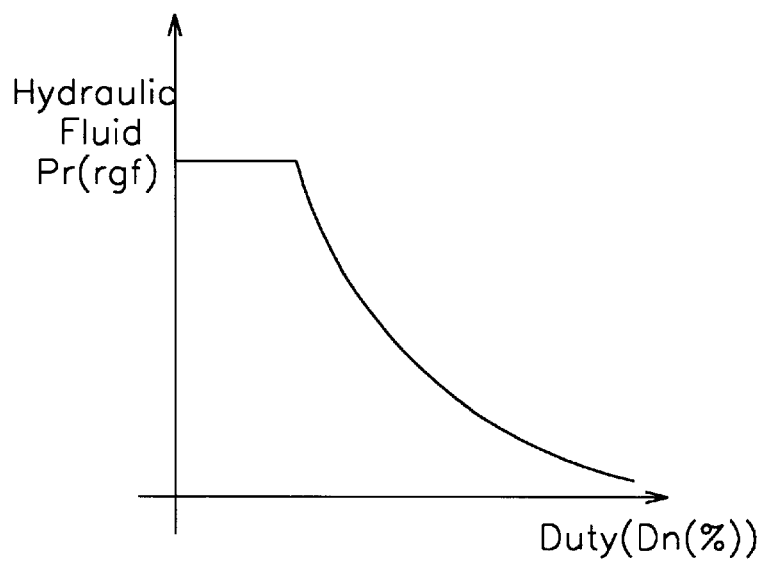
FIG. 4 is a graph illustrating a variation of a duty ratio with respect to a variation of an amount of hydraulic fluid according to the present invention.
Figure 5:
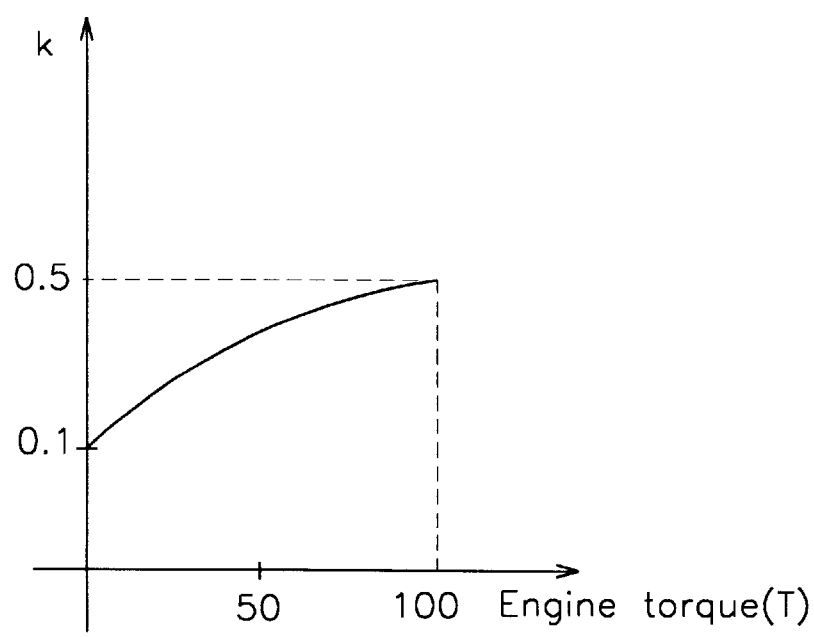
FIG. 5 is a graph illustrating a variation of an engine torque with respect to a variation of a constant according to the present invention.
Figure 6:
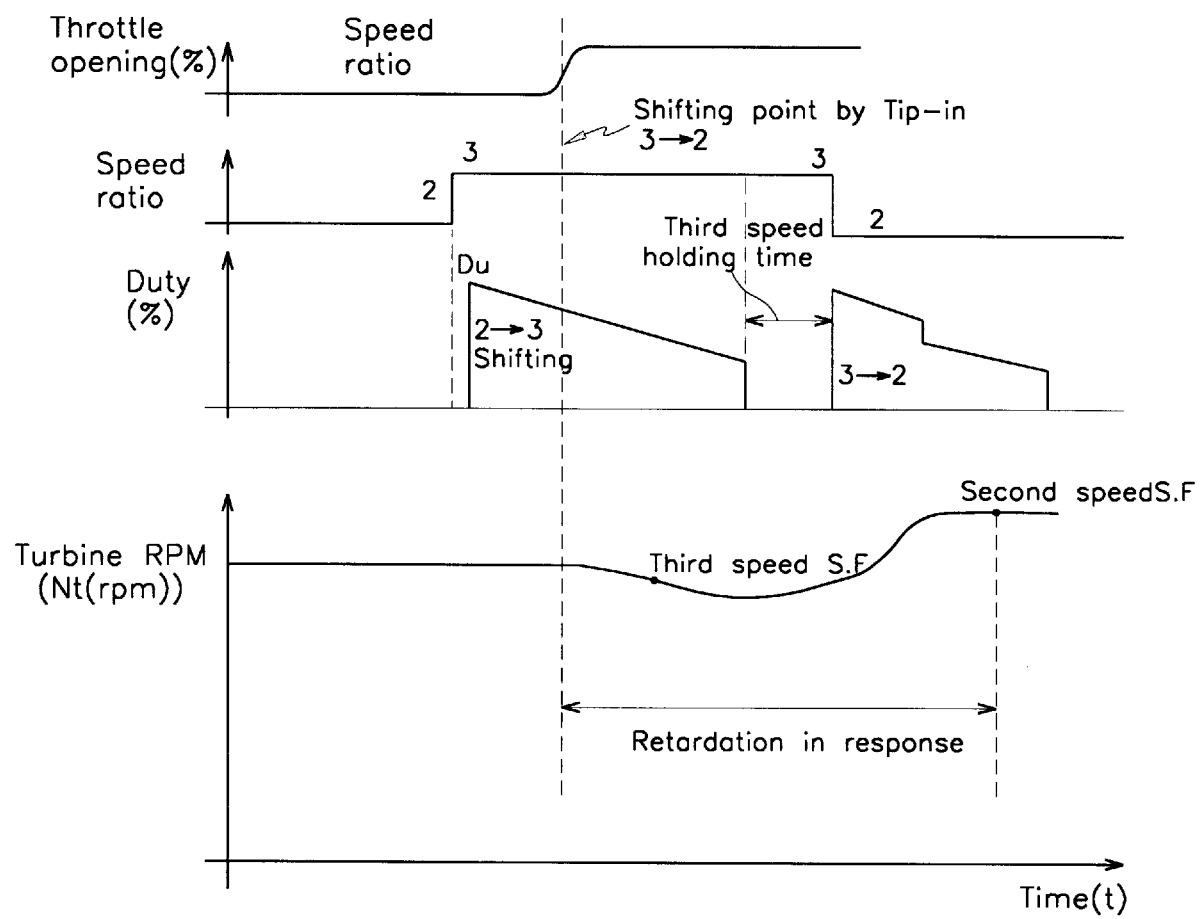
FIG. 6 is graph of a shift control pattern during the operation of a conventional shift control method.

The Pr can, as shown in FIG. 4, be calculated in accordance with the variation in duty ratio Du.

After the above, the shift control part 20 determines if a second speed kickdown shift signal is applied or not on the basis of a signal regarding the throttle opening transmitted from the throttle opening detector 11 of the drive condition detecting part 10 (S140).

In step S140, if it is determined that the second speed kickdown shift signal is applied, the shift control part 20 corrects the duty ratio in accordance with a pre-set program (S150), then initiates a predetermined variable (S160). Next, the shift control part 20 outputs a 3–2 downshifting duty control signal to the drive part 30 (S170) so that the drive part 30 can supply hydraulic fluid to friction elements to be engaged in the second speed in accordance with the duty control signal transmitted from the shift control part 20.

The duty correction value d is calculated according to the following equation 2.

$$d = P \times k \quad \text{[Equation 2]}$$

where d is an amount of duty correction, P indicates the integration value of the hydraulic fluid, and k is an operation constant.

The operation constant k may be set according to an engine torque TQ as shown in FIG. 4.

After outputting the duty control signal to the drive part 30 in step S170, the shift control part 20 determines if the output time of the 3–2 downshifting duty control signal has surpassed a first preset time of, for example, 500 ms (S180). Here, the preset time of 500 ms is calculated in accordance with a time that the turbine rpm takes to reach a shift finish point S.F., and then it is set in a program.

In step S180, if it is determined that the output time of the duty control signal has surpassed the preset time of 500 ms, the shift control part 20 outputs a predetermined duty signal to the drive part 30 for a second preset time, then it controls the duty ratio to 0% (S190).

The drive part 30 is duty-controlled in accordance with the duty control signal transmitted from the shift control part 20 to finally engage the friction elements for the second speed.

However, if a signal for downshifting to the second speed is applied from the drive condition detecting part 10 to the shift control part 20 after the upshifting to the third speed is completed, the shift control part 20 corrects the second speed kickdown control signal according to the following equation 3 and outputs the same to the drive part 30 according to the following equation 3.

$$\text{Duty}|_{3\text{-}2} = \text{Duty}|_{3\text{-}2} - d \quad \text{[Equation 3]}$$

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for automatic transmissions comprising the steps of:
    outputting a duty control signal for upshifting to a N+1 speed when an N+1 upshifting signal is input during driving in an N speed;
    pre-estimating a stroke gap of an engaging friction element for the N+1 speed;
    determining if an N speed kickdown signal is input;
    outputting a duty signal for downshifting to the N speed when the N speed kickdown signal is input.

2. A shift control method of claim 1 wherein the step of pre-estimating a stroke gap comprises the step of calculating an amount of hydraulic fluid accumulated on a side of the friction element.

3. A shift control method of claim 2 wherein the step of calculating comprises the steps of calculating an amount of hydraulic fluid with respect to a duty ratio and integrating the calculated amount of hydraulic fluid.

4. A shift control method of claim 2 wherein the step of calculating is performed during upshifting.

5. A shift control method of claim 1 further comprising the step of correcting a duty ratio when the N speed kickdown signal is input.

6. A shift control method of claim 5 wherein the step of correcting comprises the steps of calculating a constant value with respect to an engine torque ratio, and multiplying the constant value by an integration value of hydraulic fluid directed to the friction element for the N+1 speed.

7. A shift control method of claim 1 wherein the step of outputting a duty signal comprises the steps of:
   outputting the duty signal for a first predetermined time;
   outputting a duty signal for a second predetermined time; and
   controlling a duty ratio to 0%.

8. A shift control method of claim 7 wherein the first predetermined time is about 500 ms.

* * * * *